United States Patent [19]

Boy-Marcotte et al.

[11] 4,149,523
[45] Apr. 17, 1979

[54] SOLAR ENERGY COLLECTOR SYSTEM WITH CYLINDRO-PARABOLIC MIRROR

[75] Inventors: Jean-Louis Boy-Marcotte, Orsay; Jean-Louis Lamirand, Les Mureaux; Philippe A. H. Marchal, Boulogne; Richard J. A. M. Grossin, Rueil-Malmaison, all of France

[73] Assignee: Bertin & Cie, Plaisir, France

[21] Appl. No.: 803,168

[22] Filed: Jun. 3, 1977

[30] Foreign Application Priority Data

Jun. 3, 1976 [FR] France .................. 76 16811

[51] Int. Cl.² .................................................. F24J 3/02
[52] U.S. Cl. ............................................................ 126/271
[58] Field of Search .............................. 126/270, 271

[56] References Cited

U.S. PATENT DOCUMENTS

| | | | |
|---|---|---|---|
| 1,162,505 | 11/1915 | Nichols | 126/271 |
| 2,907,318 | 10/1959 | Awot | 126/271 |
| 3,915,147 | 10/1975 | Rineer | 126/271 |
| 3,974,822 | 8/1976 | Patil | 126/271 |
| 3,990,430 | 11/1976 | Robertson | 126/270 |
| 4,000,734 | 1/1977 | Matlock et al. | 126/271 |
| 4,067,319 | 1/1978 | Wasserman | 126/271 |

Primary Examiner—John J. Camby
Assistant Examiner—Larry I. Schwartz
Attorney, Agent, or Firm—A. W. Breiner

[57] ABSTRACT

A solar energy collector having concave mirrors shaped as troughs of parabolic cross-section with a longitudinal pivotal axis enabling them to be aimed at the sun and having, at intervals, connecting members for maintaining at the mirror focus a heat receiving tube of small diameter by comparison with the mirror aperture. A dusttight and moisturetight transparent chamber isolates both the receiving tube and the surface of the mirror from the surrounding atmosphere.

4 Claims, 7 Drawing Figures

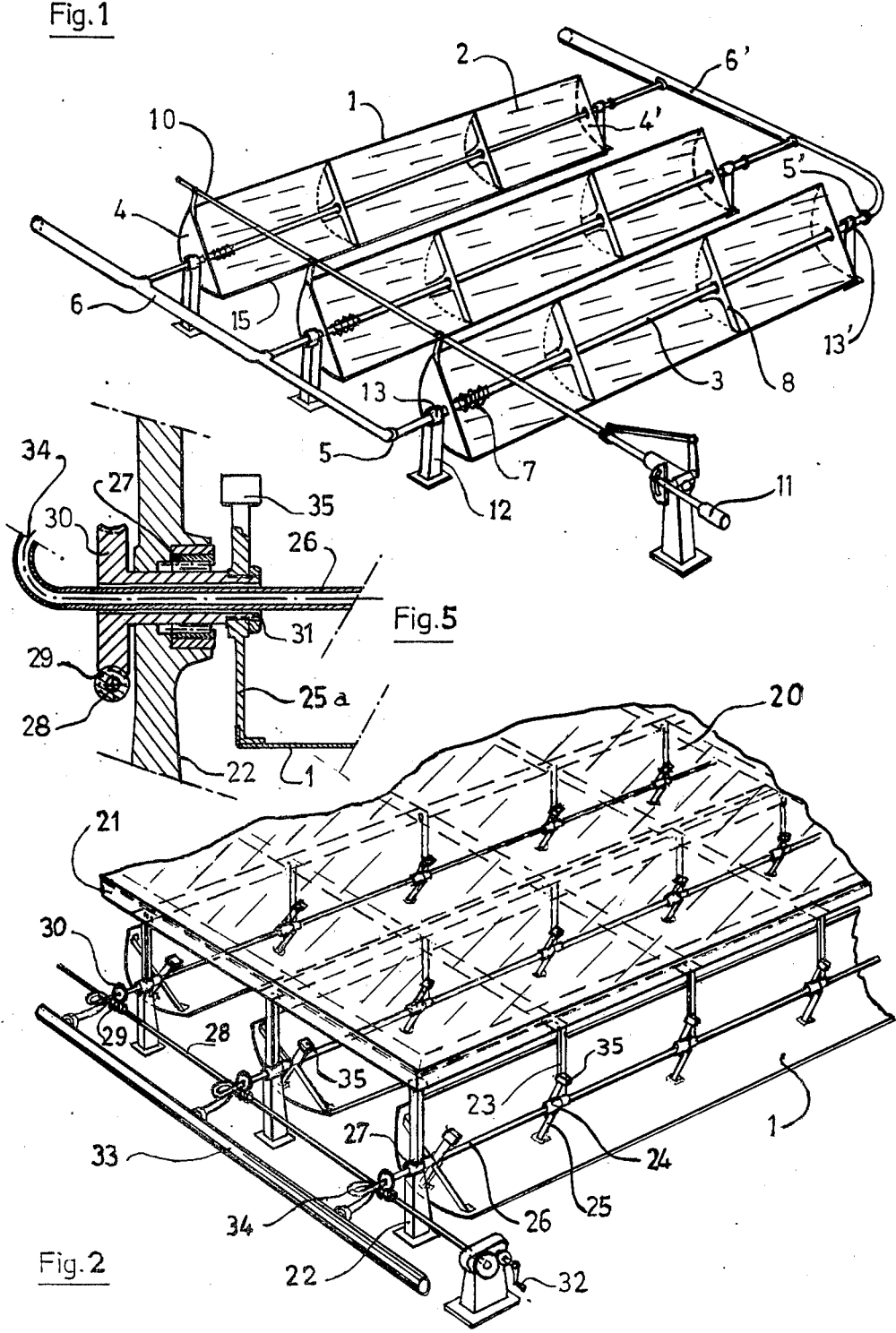

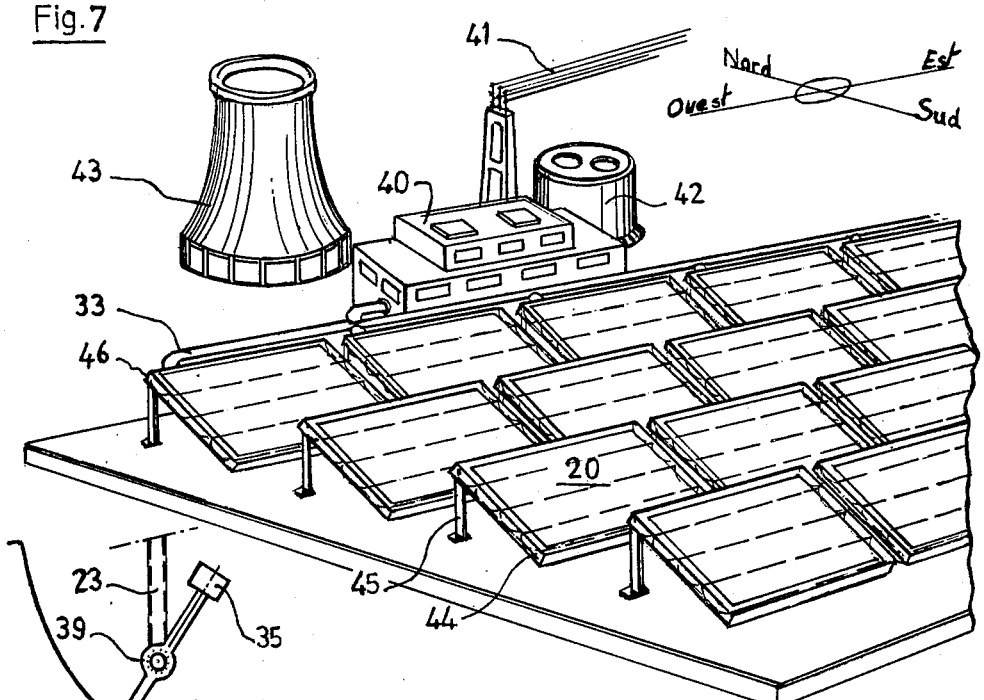
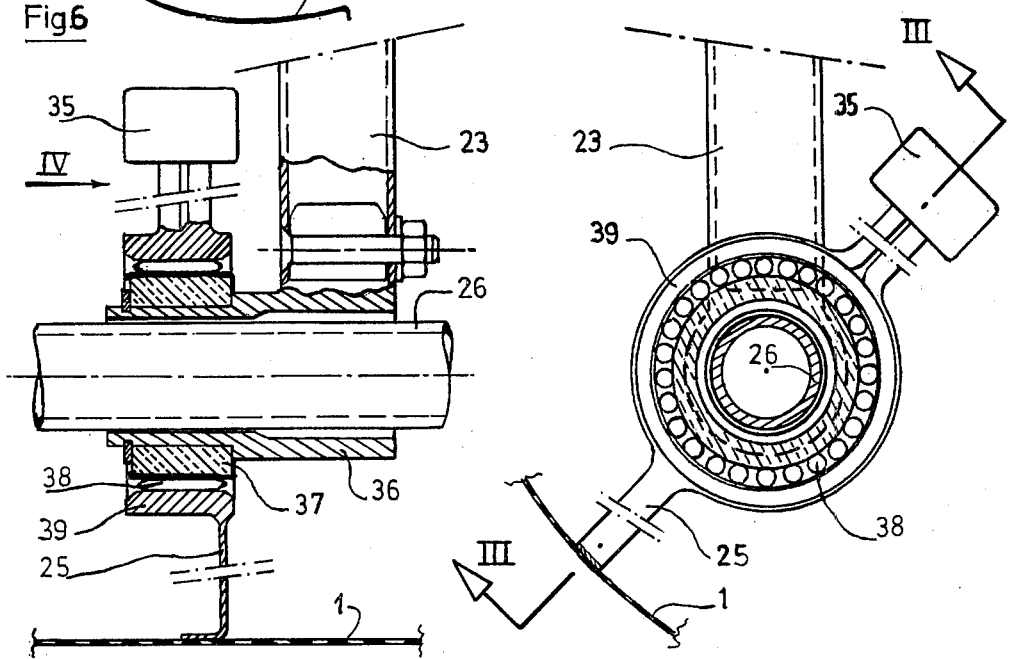

SOLAR ENERGY COLLECTOR SYSTEM WITH CYLINDRO-PARABOLIC MIRROR

The invention relates to a system for concentrating solar energy by means of at least one parabolic cylinder-forming mirror having the direction of the sun lying in its symmetry plane.

Such mirrors have long been known and are beginning to be used either singly or more usually in banks of parallel mirrors. A brief description of them is to be found in the preamble to French patent Ser. No. 1,165,672.

Such parabolic mirrors may have their focal axis oriented East-West, in which case the symmetry plane requires only to be set daily with a precision of to within about ten minutes of arc. Alternatively, the focal axis can lie in the plane defined by the vertical and the North-South direction, and in such cases the energy picked up is increased by more than 50% but it is necessary to provide an aiming mechanism that will enable the collector to follow the sun in its diurnal path by rotating about an axis parallel to the generating lines of the cylinder.

In any event, such mirrors are seldom used as yet because they are fragile and, above all, sensitive to adverse weather conditions (wind, snow, etc.). They tend to become tarnished and to become covered with dust, resulting in reduced specular reflection, and cleaning their concave surface is both difficult and costly.

The above cited French patent Ser. No. 1,165,672 describes a somewhat different system that provides very limited heating of the heat-conveying fluid-water for instance—because in this system the fluid flows through a focal tube having a very large diameter relative to the aperture, or width of the mirror. Indeed such a large relative diameter reduces the solar flux concentration factor to a value of about 5, and consequently the advantage of such a solution is very small by comparison with the flat solar energy collectors with transparent surfaces which are currently the most widely used and which produce a greenhouse effect without concentrating the solar radiation.

As for the aforesaid cylindro-parabolic collectors that provide a powerful concentration of the radiation, those known to the Applicant utilize either a mirror and a receiving tube devoid of protection against the weather, or transparent protection means very close either to the surface of the mirror or to the tube and which are mutually independent. Such transparent protection means are costly, fragile, difficult to clean and absorb a notable part of the incident solar radiation.

The present invention allows of constructing a collector or bank of collectors offering high energy concentration whereby to obtain a high temperature in the heat conveying fluid of possibly in excess of 200° C., such collector or collectors being weatherproof and as easy to service as flat collectors based on the greenhouse effect.

A collector according to this invention equipped with a cylindrical mirror of parabolic section and having the energy receiving tube at its focal point is characterized by a sealed chamber formed by transparent and generally flat surfaces that insulate both the receiving tube and the mirror from the surrounding atmosphere.

Such a chamber forms a greenhouse whose interior atmosphere is heated by the heat lost by radiation and convection from the receiving tube or tubes.

Such transparent chamber possesses the following particularities:
(a) because it is airtight, dust deposits on the mirror are avoided;
(b) its transparent and preferably flat face is as easy to clean as that of a flat collector;
(c) it limits heat losses by forced convection due to the wind, as well as heat losses due to the rain or snow which would cover the receiving tube if it were not protected;
(d) and lastly, as will be explained hereinafter, the two forms of embodiment of such chamber limit distortions of the reflecting surfaces due to wind pressure or mechanical or thermal stresses and consequently permit a high concentration factor; indeed, the latter may reach values in the region of fifty to one hundred, whereas the currently available cylindro-parabolic collectors provide concentration levels of between ten and thirty.

In a first form of embodiment, the transparent flat face is fixed to the edges of the mirror. In this case the collector is somewhat similar to the one described in the aforecited patent, but with the crucial difference that in accordance with the invention the mirror has a parabolic cross-section and a very large aperture relative to the diameter of the tube, that is, a high concentration ratio enabling a high temperature to be obtained in the receiving tube. The transparent face cooperates with the mirror to form a box member, thereby providing a very rigid unit that stands up well to stresses and adverse weather while maintaining the said high concentration ratio in service.

A second form of embodiment of the invention is characterized in that the sealed chamber is fixed and surrounds the movable member equipped with its receiving tube. As a rule, the chamber will then be a glazed structure of the greenhouse type that shelters a plurality of parallel mirrors. Being well protected against thermal and mechanical loads, these mirrors can be of very light construction yet be of sufficient precision to achieve a high concentration ratio. This results in a greatly simplified construction for the mirrors, their supports and their aiming mechanism.

The above two forms of embodiment do not prejudge of the choice of orientation for the collector (East-West with daily settings, or parallel to the North-South plane with diurnal tracking of the sun).

Characteristics common to both these embodiments are indicated hereinafter.

The focal length is short—about one-quarter of the aperture of the parabola—in order to minimize the diameter of the receiving tube located on the line joining the focal points. The solar flux concentration factor will be on the order of fifty to one hundred, resulting in useful efficiency levels even for high infrared emissivity values of the receiver tube of as much as 0.9 insofar as the solar absorption factor is high (0.9 to 0.95).

In actual practice the efficiency is comparatively insensitive to dust, since there is only one surface on which it could deposit but which is very easy to clean since it is flat and made of a hard material (glass).

The cleanliness and humidity of the air contained between the mirror and the glass is controlled either by an arrangement of filters or by insuring complete airtightness preferably in conjunction with means for compensating for the expansion of the air due to heating or for limiting the overpressure which such heating would cause.

The great length of the receiving tube (several meters) and its freedom of longitudinal expansion make it an excellent way of measuring the temperature of the heat conveying fluid, for the end of the tube moves through about 0.1mm per degree centigrade. Moreover it can be used with advantage as a signal for controlling the output of the heat-conveying fluid circulation pump.

Should circulation of the fluid cease for any reason, the mirror is aimed away from the direction of the sun in order to avoid boiling of the heat conveying fluid. This aiming away can be controlled by the longitudinal expansion of the receiving tube beyond a threshold in the region of 300° C. to 400° C.

Aiming accuracy implies an angle of less than 0.1 degree between the symmetry plane of the collector and the direction of the sun. To achieve this accuracy, the control system must be demultiplied in a large ratio (50 to 3600) by worm-screw, gear or lever systems.

In the case of the North-South collectors, automatic means comprising a sun locating solar sensor, a control logic and a power unit will enable the sun to be tracked along its diurnal path.

In the case of East-West collectors, a simple automatic or possibly manual daily or weekly (depending on the season) setting advice will suffice.

A plurality of mirrors are coupled together in order to limit the number of aiming elements. The coupling means used for the purpose may be coupling bars, rods with screw-thread adjustments, cables, or the like.

The control system enables the set of mirrors to be aimed at or away from the sun for start-ups or shutdowns.

Preferably, the axis of the receiving tube coincides with the pivotal axis of the mirror as the same moves to point at the sun. Said tube may even form the material shaft for such pivotal motion, or may be fixed or coupled with the mirror.

The description which follows with reference to the accompanying non-limitative exemplary drawings of the two main embodiments of the invention will give a clear understanding of how the same can be carried into practice.

In the drawings:

FIG. 1 is an illustration in perspective of a solar energy collector formed by a bank of mirrors, each with an incorporated transparent wall;

FIG. 2 shows in perspective a bank of solar energy collectors inside a greenhouse;

FIGS. 3 and 4 show, on an enlarged scale, a detail of FIG. 2, respectively in partial section along the axis of the receiving tube, and in end view;

FIG. 5 is another enlarged detail view of FIG. 2, in partial section along the axis of the receiving tube;

FIG. 6 is an end view of a mirror and its support; and

FIG. 7 is an illustration in perspective of a factory employing a system of solar energy collectors according to this invention.

DESCRIPTION OF FIRST FORM OF EMBODIMENT (FIG. 1)

Each mirror is formed by an aluminum trough 1 of parabolic section which performs the simultaneous function of a rigid structure and a polished concave surface for providing specular reflection of solar radiation. The trough 1 is closed by a glazing 2 in such manner that the line joining the focal points of the parabolas, which coincides with the axis of receiving tube 3, should lie within the closed unit formed by mirror 1 and glazing 2. Flat end covers 4 and 4' of parabolic outline close the ends of each unit, and elastic seals 15 render the space bounded by the mirror, the glazing and the end covers completely hermetic.

Each receiving tube 3 is rigidly fixed to covers 4, 4', through which it extends for communication via flexible pipes or rotary seals 5 and 5' with manifolds 6 and 6' for the heat conveying fluid flowing through it. The respective expansions of the different parts are absorbed by the elasticity of seals 15 and by deformation of the end covers 4. If the latter are too thick and rigid, receiving tube 3 can be provided with expansion bellows 7 since the tube 3 may have its length increased by several centimeters when it is heated. Intermediate struts 8 join the edges and/or the apex of the mirror to tube 3.

The overpressure produced by heating of the internal air can be avoided by balancing the internal and ambient pressures, for instance through a filter (not shown) preferably in conjunction with dehydrating means in order to avoid water condensation on the inside face of glazing 2.

Each mirror in the bank of collectors shown in FIG. 1 is connected to its neighbors through rods 10 hingedly connected to their upper edges and manually actuated by a lever 11 the position of which can be accurately located on a graduated sector whereby to permit collective adjustment of the optimum orientation of the several mirrors relative to the altitude of the sun. Each rod 10 includes fine adjustment means (not shown) for adjusting the parallelism of the planes of symmetry of the mirrors. Such parallelism can be maintained in operation provided that a material with a low thermal expansion coefficient is chosen for construction of said rods.

Each mirror-glazing assembly is supported on the ground by posts 12, and each post 12 is provided with a bearing 13 for supporting the ends of tubes 3 proximate the rotary of flexible seals 5 or 5'.

The length of these mirror-glazing assemblies is limited by their degree of sag between bearings 13 and 13' owing to their weight.

DESCRIPTION OF SECOND FORM OF EMBODIMENT (FIGS. 2 THROUGH 6)

A bank of mirrors 1 is placed wholly inside an airtight building with a greenhouse type of upper structure, formed in this case by an open framework 21 sealingly covered with glazing 20. This upper structure is generally flat and preferably disposed along an oblique plane perpendicular to the mean altitude of the sun at the construction site, whereby such obliquity will be substantially equal to the latitude of that geographic location. The lateral walls of the building are not shown in the drawing.

This form of embodiment permits the use of very long mirrors which are consequently less costly to manufacture and maintain, as well as easier to adjust. It is therefore particularly advantageous for solar energy collectors of large expanse, for instance for use in electric power stations.

The following added advantages flow from this second embodiment of the invention:

the mirror 1 is subjected to only very small mechanical loads because it is subjected neither to aerodynamic loads due to the wind nor to any pressure differentials;

thermal stresses are low because of the existence of an isothermal atmosphere; and the protective glazing 20 is entirely independent of the mirror, thereby avoiding any stresses which could steam from glazing/mirror connections.

Since the only distortions will be those stemming essentially from the weight of the mirrors themselves, this makes it advantageous to adopt relatively small apertures of about 0.5 to 2 meters and to limit as far as possible the thickness required for the rigidity of the reflecting surface (about one millimeter in the case of aluminum, for example), which surface may possibly be strengthened by means of ribs (not shown).

The low weight of the individual mirrors 1 enables each of them to be supported by framework 21, which is itself supported, at a height above the ground at least equal to the aperture of the mirrors, by posts 22. Dependent from the framework are intermediate supports 23 terminating in bearings 24, and it is these intermediate supports 23 which permit the use of very long mirrors, as indicated precedingly. Hingedly connected to bearings 24 are arms 25 fixed to mirror 1.

Additional means are provided which are likewise intended to reduce stress and distortion in the mirrors so that, in service, they should retain their parabolic shape with the precision needed to obtain the high concentration factor which this invention has as one of its objects.

Thus, as shown in FIG. 6, each arm 25 is preferably fixed at a point substantially on the longitudinal symmetry plane of the mirror it supports. In this way, the edges of the mirrors are left free and are therefore relieved of any stresses they might otherwise be subjected to because of differential expansions stemming from a direct fixture between the receiving tube and the edge of the mirror.

The arms 25 or 25a may support balancing weights 35 in order to bring the center of gravity of the mirror over the aim hinge-line, and this preferably over the entire length of the mirror in order to limit torsional and bending stresses due to the weight of the mirror.

One of the bearings 24 is shown in detail in FIGS. 3 and 4. The support 23 is extended by a hollow hub 36 which may be bolted to it for example. The bore of hub 36 is formed with a narrower portion having an antifriction lining thereon into which the receiving tube 26 is inserted with a slight clearance in order to maintain said tube at the focus of mirror 1 yet allow it to expand diametrically and lengthwise without reacting on arm 25 and hence on mirror 1.

The hub 36 likewise supports a bushing made of heat insulating material which supports, without heating it, an antifriction bearing 38 about which is freely rotatable the bore in shaft 39 of arm 25. The bearings 38 produce only negligible torsional forces, thereby avoiding any torsional distortion of the open trough formed by mirror 1, notably during aiming motions.

The bearing 27 located at the end of the mirror (see FIG. 5) differs from the bearing 24 employed along the length thereof, for it authorizes not only rotation of the mirror about the axis of the receiving tube but also transmits the aiming forces from the drive system 28 to mirror 1.

The post 22 supports the bearing 27 which is traversed by tube 26. In this case the aiming motion is imparted through a shaft 28 with worm-screws 29 driving gearwheels 30 each of which is united with an arm 25a of one of the mirrors by means of a sleeve 31. Shaft 28 can be driven by a servomotor (not shown) or by means of the handle 32 shown in FIG. 2.

Tube 26 is free to expand longitudinally through the sleeve 31 with minimum friction. This tube is not driven during aiming rotation of the mirror and is connected to manifold 33 through a lyre-shaped expansion union 34. This arrangement avoids the use of a rotary or sliding joint with the manifold, thereby making it possible to provide durable sealing for the heat-conveying fluid circuit formed by the receiving tubes 26 and the manifolds 33.

Considering next the general construction of the greenhouse type of protection for the solar energy collectors, the framework 21 shown in FIG. 2 may be formed by a flat box structure 44 made of metal latticework shown in FIG. 7. This box structure, the thickness of which is substantially equal to the mirror aperture, can be prefabricated.

Each box structure formed thus receives mirror systems which, for example, could be those described with reference to FIGS. 2 through 5, and it is supported on the ground in a sloping position by means of posts 45 and its upper structure is covered with glazing 20 and associated sealing means.

Similarly, the two lateral walls along either end of the mirror and the south-facing surface are sealingly glazed. The north-facing lateral wall and the bottom structure parallel to the upper structure are covered with dust-proof surfacing 46. Example: The dimensions and parameters indicated below (FIG. 6) can be used for either of the forms of embodiment described hereinbefore:

Mirror: Aperture 1m, Focal length 0.25m
Diameter of receiving tube: 0.015m
Solar flux concentration factor: 70
Absorption coefficient of receiving tube: 0.95
Transmission coefficient of glazing: 0.90
Coefficient of reflection of mirror: 0.85
Coefficient of infrared emissivity of tube: 0.20

The efficiency of the system, which is defined as the ratio of the thermal flux absorbed by the receiving tube to the incident solar flux normal to the tube axis, is tabulated below in the case of this solar energy collector:

| Incident solar flux (W/m$^2$) | Temperature of receiving tube (° C.) | 100° C. | 200° C. | 300° C. |
| --- | --- | --- | --- | --- |
| 990 | | 0.674 | 0.576 | 0.456 |
| 725 | | 0.654 | 0.520 | 0.355 |
| 435 | | 0.605 | 0.383 | 0.108 |

FIG. 7 illustrates a thermal power station 40 which generates electric current on a power line 41, with a heat accumulator 42 to permit night-time production and an atmospheric cooling tower 43.

Solar energy collectors according to the present invention heat the heat-conveying fluid which is delivered to the power station by manifolds 33.

We claim:

1. In a process for keeping under control the operation of a solar energy collector of the kind having heat-receiving tubes which are thermally expansible along the longitudinal axis thereof, and solar heat transfer accessories associated with said tubes and comprising (i) cylindro-parabolical concave mirrors rotatable substantially about the focal axis thereof to train said mirrors towards the sun under normal working conditions, said mirrors concentrating heat radiations of the sun on said tubes which extend substantially along said focal axis thereof, and (ii) means for circulating heat absorbing fluid through said tubes to carry away therefrom the absorbed heat, the improvement comprises the steps of detecting excessive longitudinal expansion of said tubes due to overheating thereof, and applying the thus detected excessive longitudinal expansion to check said overheating by action upon said solar heat transfer accessories either by reducing the amount of heat input provided from said mirrors or by increasing heat output carried by said circulated fluid.

2. Process as claimed in claim 1, wherein the overheat checking step comprises de-training said mirrors away from the sun.

3. Process as claimed in claim 2, wherein said mirrors are de-trained away from the sun when the detected expansion corresponds to a temperature of about 300° to 400° C.

4. Process as claimed in claim 1, wherein the overheat checking step comprises accelerating the circulation of said fluid.

* * * * *